US011118132B2

(12) United States Patent
Sakaino et al.

(10) Patent No.: US 11,118,132 B2
(45) Date of Patent: Sep. 14, 2021

(54) METHOD FOR SUPPRESSING COLORATION OF FRYING FATS AND OILS COMPOSITION

(71) Applicant: J -OIL MILLS, INC., Tokyo (JP)

(72) Inventors: Masayoshi Sakaino, Tokyo (JP); Ryuji Hori, Tokyo (JP); Hisashi Arai, Tokyo (JP); Naruto Makita, Tokyo (JP); Ryo Okabe, Tokyo (JP); Takashi Sano, Tokyo (JP)

(73) Assignee: J -OIL MILLS, INC., Tokyo (JP)

( * ) Notice: Subject to any disclaimer, the term of this patent is extended or adjusted under 35 U.S.C. 154(b) by 0 days.

(21) Appl. No.: 16/964,620

(22) PCT Filed: Jan. 21, 2019

(86) PCT No.: PCT/JP2019/001617
§ 371 (c)(1),
(2) Date: Jul. 24, 2020

(87) PCT Pub. No.: WO2019/151007
PCT Pub. Date: Aug. 8, 2019

(65) Prior Publication Data
US 2021/0054304 A1    Feb. 25, 2021

(30) Foreign Application Priority Data
Jan. 31, 2018   (JP) .............................. JP2018-015952

(51) Int. Cl.
*C11B 3/00* (2006.01)
*A23D 9/02* (2006.01)
*C11B 3/08* (2006.01)
*A23D 9/00* (2006.01)
*C11B 3/12* (2006.01)

(52) U.S. Cl.
CPC ............... *C11B 3/001* (2013.01); *A23D 9/00* (2013.01); *A23D 9/02* (2013.01); *C11B 3/08* (2013.01); *C11B 3/12* (2013.01)

(58) Field of Classification Search
CPC ..... C11B 3/00; C11B 3/08; C11B 3/10; C11B 3/001; A23D 9/00; A23D 9/02
See application file for complete search history.

(56) References Cited

U.S. PATENT DOCUMENTS 5,981,781 A * 11/1999 Knowlton ............... C11C 1/04
554/224
8,241,695 B2 * 8/2012 Yamada ............... C11B 3/001
426/610
2011/0059222 A1    3/2011 Yamada et al.

FOREIGN PATENT DOCUMENTS

| EP | 2351822 A1 | 8/2011 | |
| JP | 2000-282080 A * | 10/2000 | .............. A23D 9/00 |
| JP | 2002-238455 A | 8/2002 | |
| JP | 2006-316254 A * | 11/2006 | .............. C11B 3/12 |
| JP | 2015-119728 A * | 7/2015 | .............. A23D 9/00 |
| WO | 2015/064569 A1 | 5/2015 | |
| WO | WO 2015/064569 * | 5/2015 | ........... C11B 5/0071 |

OTHER PUBLICATIONS

JP 2006-31254, Miyake, H., et al., Palm Oils having suppressed het discoloration and method for producing the same, English translation, 8 pages (Year: 2006).*
WO 2015/064569, Fuji Oil, Co., Ltd, Cooking Fat, English translation, 20 pages (Year: 2015).*
JP 2015-119728, Hori, R., et al., Method for producing fried-food fat composition, English translation, 13 pages (Year: 2015).*
JP 2000-282080 (A), Tanaka, R. et al., Mixed edible oil and its use, English translation 26 pages (Year: 2000).*
International Search Report (ISR) dated Apr. 23, 2019 filed in PCT/JP2019/001617.

\* cited by examiner

*Primary Examiner* — Yate' K Cutliff
(74) *Attorney, Agent, or Firm* — Rankin, Hill & Clark LLP

(57) ABSTRACT

[Problem] To provide: a method for suppressing the coloration of oils and fats during frying; and a coloring inhibitor. [Solution] A method for suppressing the coloration of an oil/fat composition for frying, the method comprising a step for adding a prepared oil to an edible oil or fat, wherein the prepared oil is obtained through (1) a degumming step, (2) a neutralization step which may or may not be performed, (3) a bleaching step which may or may not be performed, and (4) a deodorizing step, in this order, in the process of refining a crude oil obtained from an oil feedstock, and the absorbance difference determined by subtracting the absorbance at a wavelength of 750 nm from the absorbance at a wavelength of 660 nm of the prepared oil obtained from step (3) is at least 0.030 when isooctane is used as the control. A coloring inhibitor characterized by containing said prepared oil.

10 Claims, No Drawings

METHOD FOR SUPPRESSING COLORATION OF FRYING FATS AND OILS COMPOSITION

TECHNICAL FIELD

The present invention relates to a method for suppressing coloration of a fats and oils composition for frying, more specifically the suppressing method characteristically using a prepared oil obtained by adjusting a process of refining a crude oil.

BACKGROUND ART

When frying a foodstuff using an edible oil or fat such as soybean oil and rapeseed oil, the edible oil or fat gets colored by influences of heating operation, and oxygen and water in the foodstuff and atmosphere. As the coloration of the edible oil or fat progresses, a quality of a fried food deteriorates, so that the edible oil or fat cannot be used for a long time.

As a prior art for suppressing heat coloration in frying a foodstuff with an edible oil or fat, Patent Document 1 proposes a method for improving heat resistance of a frying fats and oils composition by adding a pressed oil and/or extracted oil, and a phosphorus-derived component such as degummed oil to a refined edible oil or fat. According to the invention in Patent Document 1, it is possible to improve heat stability of the frying fats and oils composition, particularly to suppress heat coloration and cooked odor.

PRIOR ART DOCUMENTS

Patent Documents

Patent Document 1: Japanese Patent Application Laid-Open No. 2009-050234 (Method for Producing an Oil and Fat Composition for Deep-Fried Food Having Excellent Heat Resistance)

SUMMARY OF INVENTION

Problem to be Solved

An object of the present invention is to provide a novel method for suppressing coloration of a fats and oils composition due to frying of a foodstuff with the fats and oils composition, in a different manner from the method using the phosphorus content in Patent Document 1.

Solution to Problem

As a result of intensive studies on the above problems, the inventors have found that a prepared oil obtained by adjusting a refining process so as to meet a certain condition is added to an edible oil or fat to solve the above problems. That means, the present invention relates to a method for suppressing coloration of a frying fats and oils composition, the method including a step of adding a prepared oil to an edible oil or fat, wherein
the prepared oil is obtained through
(1) a degumming step,
(2) a neutralization step which is performed or not performed,
(3) a bleaching step which is performed or not performed, and
(4) a deodorizing step,
in this order, in a process of refining a crude oil obtained from an oil feedstock, and
an absorbance difference determined by subtracting an absorbance at a wavelength of 750 nm from an absorbance at a wavelength of 660 nm of the prepared oil after the step (3) is at least 0.030 when isooctane is used as a control.

Although Patent Document 1 describes an intermediate oil or fat such as a crude oil like a pressed oil or an extracted oil, a degummed oil, and a crude refined oil obtained by process excluding only a neutralization step, Patent Document 1 discloses no prepared oil having such an absorbance difference as prescribed in the present invention.

Preferably, the absorbance difference is at least 0.045.

Preferably, the deodorizing step is performed under a condition that a usage amount of water vapor is 0.1% by mass or more and 10% by mass or less, a deodorizing temperature is 180° C. or more and 300° C. or less, and a deodorizing time is 10 minutes or more and 240 minutes or less.

Preferably, the oil feedstock is at least one selected from soybean, rapeseed, and palm flesh.

Preferably, the edible oil or fat contains at least one selected from soybean oil, rapeseed oil, palm-based oil or fat, corn oil, sunflower oil, olive oil, cottonseed oil, rice bran oil, and safflower oil.

Preferably, a content of the prepared oil in the frying fats and oils composition is 0.05% by mass or more and 20% by mass or less.

In the suppressing method, the prepared oil may be added to the edible oil or fat such that a phosphorus content derived from the prepared oil in the frying fats and oils composition is 0.01 ppm by mass or more and 10 ppm by mass or less.

Particularly, the bleaching step (3) is performed.

Preferably, the frying fats and oils composition contains a silicone.

The present invention also relates to a coloring inhibitor for a frying fats and oils composition, the coloring inhibitor containing a prepared oil, wherein
the prepared oil is obtained through
(1) a degumming step,
(2) a neutralization step which is performed or not performed,
(3) a bleaching step which is performed or not performed, and
(4) a deodorizing step,
in this order, in a process of refining a crude oil obtained from an oil feedstock, and
an absorbance difference determined by subtracting an absorbance at a wavelength of 750 nm from an absorbance at a wavelength of 660 nm of the prepared oil after the step (3) is at least 0.030 when isooctane is used as a control.

Effects of Invention

The method for suppressing coloration of the frying fats and oils composition and a coloring inhibitor for the frying fats and oils composition according to the present invention makes it possible to significantly suppress coloration of the fats and oils composition compared to coloration of a control oil with no prepared oil even if the frying fats and oils composition is used for frying a foodstuff e.g. for as long as 20 hours. This suppression of coloration greatly contributes to life prolongation of the fats and oils composition.

DESCRIPTION OF EMBODIMENTS

Hereinafter, embodiments of the present invention will be explained. The method for suppressing coloration of the frying fats and oils composition during heating according to the present invention (hereinafter, referred to as the method according to the present invention) includes a step of adding a prepared oil to an edible oil or fat. The edible oil or fat serves as a base oil for the frying fats and oils composition. The edible oil or fat is usually a refined oil. Examples of the edible oil or fat include: a vegetable oil or fat such as soybean oil, rapeseed oil, palm oil, palm kernel oil, corn oil, sunflower oil, olive oil, grape seed oil, cottonseed oil, safflower oil, linseed oil, sesame oil, rice bran oil, peanut oil, and coconut oil; an animal oil or fat such as lard, beef tallow, chicken fat, and milk fat; medium chain fatty acid triglyceride; and a processed oil or fat thereof obtained by fractionation, hydrogenation, transesterification, or the like. Each of these edible oils or fats may be used alone or in combination. The edible oil or fat preferably contains at least one selected from soybean oil, rapeseed oil, palm-based oil or fat, corn oil, sunflower oil, olive oil, cottonseed oil, rice bran oil, and safflower oil, more preferably contains at least one selected from soybean oil, rapeseed oil, and palm-based oil or fat. In the edible oil or fat, the total content of the soybean oil, rapeseed oil, palm-based oil or fat, corn oil, sunflower oil, olive oil, cottonseed oil, rice bran oil, and safflower oil is preferably 60% by mass or more and 100% by mass or less, more preferably 75% by mass or more and 100% by mass or less, even more preferably 90% by mass or more and 100% by mass or less, particularly preferably 100% by mass. Herein, the palm-based oil or fat refers to a palm oil and a processed palm oil or fat.

The edible oil or fat has a melting point of preferably 10° C. or less, more preferably 0° C. or less. Note that, in this specification, the melting point refers to a slip melting point. The slip melting point can be measured in accordance with Standard Methods for the Analysis of Fats, Oils and Related Materials 2. 2. 4. 2-1996.

A content of the edible oil or fat is usually 80% by mass or more, preferably 88% by mass or more, more preferably 90% by mass or more, particularly preferably 93% by mass or more based on the frying fats and oils composition. Although the upper limit of the content of the edible oil or fat is not particularly set, the total content of the edible oil or fat and the prepared oil is 100% by mass or less.

The prepared oil is obtained through (1) a degumming step, (2) a neutralization step which is performed or not performed, (3) a bleaching step which is performed or not performed, and (4) a deodorizing step, in this order, in a process of refining a crude oil obtained from an oil feedstock.

Examples of the oil feedstock include soybean, rapeseed, palm flesh, corn, olive, grape seed, sesame, safflower, sunflower, cottonseed, rice bran, peanut, palm kernel, coconut, linseed, and the like. The oil feedstock is preferably at least one selected from soybean, rapeseed, and palm flesh, more preferably at least one selected from soybean and rapeseed.

The crude oil can be obtained by squeezing extraction and/or solvent extraction of the oil feedstock. In the squeezing extraction, an oil content in a cell is squeezed out by applying a high pressure to the oil feedstock. The squeezing extraction is suitable for an oil feedstock having a relatively high oil content, like sesame. In the solvent extraction, the oil feedstock is pressed or squeezingly extracted, then a residue is brought into contact with a solvent, an oil content is extracted as a solvent solution, and from the obtained solution, the solvent is distilled off to obtain an oil content. The solvent extraction is suitable for an oil feedstock having a low oil content, like soybean. For the solvent, an organic solvent such as hexane is used.

In the degumming step (1), a gummy matter contained in the oil content and including a phospholipid as a main ingredient is removed by hydration. In the present invention, processing conditions for the degumming step are not particularly limited, and general-purpose conditions can be used. For example, a usage amount of water is usually 1% by mass or more and 5% by mass or less, preferably 1.5% by mass or more and 3% by mass or less based on the crude oil. A degummer aid composed of an aqueous solution of an acid such as oxalic acid, citric acid, and phosphoric acid may be appropriately added. A degumming temperature is usually 40° C. or more and 95° C. or less, preferably 60° C. or more and 95° C. or less. Water vapor or water is added to the crude oil and stirred, so that the gummy matter is hydrated to become water-soluble, and moves to a water layer. A stirring time is usually 1 minute or more and 60 minutes or less. This water layer is separated and removed by a centrifuge to obtain a degummed oil.

In the neutralization step (2), the oil is processed with an aqueous solution of an alkali such as sodium carbonate and caustic soda to remove a free fatty acid as a soap content in the oil content. In the present invention, processing conditions for the neutralization step are not particularly limited, and general-purpose conditions can be used. For example, an aqueous solution of 3% by mass or more and 40% by mass or less of alkali is added, in an amount of usually 0.1% by mass or more and 5% by mass or less, preferably 0.5% by mass or more and 3% by mass or less, to the degummed oil. A neutralization temperature may be usually 20° C. or more and 120° C. or less, preferably 35° C. or more and 95° C. or less. The soap content insoluble in oils/fats is separated and removed by a centrifuge or the like to obtain a neutralized oil.

Preferably, the neutralization step (2) is not performed.

The neutralization step may be performed by a physical refining method using no alkali. Examples of the physical refining method include a steam distillation method and a molecular distillation method.

In the bleaching step (3), a pigment contained in the oil content is adsorbed to activated clay, activated carbon, or the like under reduced pressure, and removed. The bleaching step is usually performed in the absence of water, but may be performed in the presence of water. As conditions for the bleaching step in a usual refining process, a usage amount of the activated clay is 0.05% by mass or more and 5% by mass or less based on the oil or fat, a bleaching temperature is 60° C. or more and 120° C. or less, and a bleaching time is 5 minutes or more and 120 minutes or less. The activated clay or the like stuck with the pigment in the bleaching step is removed by filtration under reduced pressure, or the like to obtain a bleached oil.

In the present invention, the usage amount of the activated clay is preferably 0.05% by mass or more and 2% by mass or less, more preferably 0.05% by mass or more and 1% by mass or less, even more preferably 0.05% by mass or more and 0.7% by mass or less, still even more preferably 0.05% by mass or more and 0.6% by mass or less based on the degummed oil or the neutralized oil. The bleaching temperature is preferably 70° C. or more and 120° C. or less, more preferably 75° C. or more and 110° C. or less. Furthermore, the bleaching time is preferably 5 minutes or more and 80 minutes or less, more preferably 5 minutes or more and 60 minutes or less. When a mild bleaching step or no bleaching step is performed under such a condition, a prepared oil having an absorbance difference within a range prescribed in the present invention can be easily obtained.

In the deodorizing step (4), an odorous component contained in the oil content is removed by steam distillation under reduced pressure. In the deodorizing step under a usual refining condition, a usage amount of water vapor is 0.1% by mass or more and 10% by mass or less based on the oil or fat, a deodorizing temperature is 180° C. or more and 300° C. or less, a reduced pressure degree is 150 Pa or more and 1,000 Pa or less, and a deodorizing time is 10 minutes or more and 240 minutes or less. Note that, in the present invention, the usage amount of water vapor is preferably 0.3% by mass or more and 8% by mass or less, more preferably 0.3% by mass or more and 5% by mass or less based on the degummed oil, the neutralized oil, or the bleached oil. The deodorizing temperature is preferably 200° C. or more and 300° C. or less, more preferably 230° C. or more and 300° C. or less, even more preferably 240° C. or more and 280° C. or less. The reduced pressure degree is preferably 200 Pa or more and 800 Pa or less depending on the temperature. In addition, the deodorizing time is preferably 20 minutes or more and 240 minutes or less depending on the deodorizing temperature and the reduced pressure degree. Particularly, the deodorizing step is performed under an enhanced refining condition that the usage amount of water vapor is 0.3% by mass or more and 5% by mass or less based on the degummed oil, the neutralized oil, or the bleached oil, the deodorizing temperature is 240° C. or more and 280° C. or less, and the deodorizing time is 20 minutes or more and 240 minutes or less, so that odor of the frying fats and oils composition during heating can be suppressed.

An absorbance difference determined by subtracting an absorbance at a wavelength of 750 nm from an absorbance at a wavelength of 660 nm of the prepared oil after the step (3) using isooctane as a control is at least 0.030, preferably at least 0.045, more preferably at least 0.065. When the absorbance difference is at least 0.030, a high coloration-suppressing effect can be obtained, and an amount of the prepared oil added to the edible oil or fat can be reduced. The upper limit of the absorbance difference is usually at most 2.0, preferably at most 1.5, more preferably at most 1.0.

Note that, in a case that the neutralization step (2) is or is not performed and the bleaching step (3) is performed, the absorbance difference refers to a calculated value of the bleached oil. In a case that the neutralization step (2) is performed and the bleaching step (3) is not performed, the absorbance difference refers to a calculated value of the neutralized oil. In a case that the neutralization step (2) is not performed and the bleaching step (3) is not performed, the absorbance difference refers to a calculated value of the degummed oil.

A content of the prepared oil in the frying fats and oils composition may usually be 0.05% by mass or more and 20% by mass or less, preferably 0.05% by mass or more and 12% by mass or less, more preferably 0.1% by mass or more and 12% by mass or less, even more preferably 0.1% by mass or more and 10% by mass or less, still even more preferably 0.25% by mass or more and 7% by mass or less.

The prepared oil may be added such that a content of a prepared oil-derived phosphorus in the fats and oils composition is preferably 0.01 ppm by mass or more and 10 ppm by mass or less, more preferably 0.1 ppm by mass or more and 10 ppm by mass or less.

Preferably, the frying fats and oils composition contains a silicone oil. For the silicone oil, a type which is usually blended into a frying edible oil or fat can be used. A kinematic viscosity of the silicone oil at 25° C. is preferably 10 cSt or more and 1,200 cSt or less, more preferably 80 cSt or more and 1,200 cSt or less, even more preferably 400 cSt or more and 1,200 cSt or less, particularly preferably 900 cSt or more and 1,100 cSt or less. A content of the silicone oil in the frying fats and oils composition is preferably 0.5 ppm by mass or more and 10 ppm by mass or less, more preferably 1 ppm by mass or more and 5 ppm by mass or less, even more preferably 2 ppm by mass or more and 4 ppm by mass or less, particularly preferably 3 ppm by mass.

A general-purpose auxiliary which is added to an edible oil or fat can be added to the frying fats and oils composition unless the effects of the present invention are inhibited. Examples of the auxiliary include an antioxidant such as tocopherol; a flavor; an emulsifier; and the like.

The frying fats and oils composition can be used for frying e.g. at 140° C. or more and 200° C. or less depending on a foodstuff and a cooking method. Examples of the fried food include deep-fried chicken, croquette, tempura, fried vegetable and fish without coating, cutlet, fritter, friedcake or fried bread, fried noodle, and the like.

The present invention also relates to a coloring inhibitor for suppressing coloration of a frying fats and oils composition, the coloring inhibitor containing, wherein
the prepared oil is obtained through
(1) a degumming step,
(2) a neutralization step which is performed or not performed,
(3) a bleaching step which is performed or not performed, and
(4) a deodorizing step,
in this order, in a process of refining a crude oil obtained from an oil feedstock, and
an absorbance difference determined by subtracting an absorbance at a wavelength of 750 nm from an absorbance at a wavelength of 660 nm of the prepared oil after the step (3) is at least 0.030 when isooctane is used as a control. Since the details of the prepared oil are the same as explained in the suppressing method, explanation of the content is omitted.

A carrier (diluent) for the prepared oil in the coloring inhibitor is usually an edible oil or fat, and specific examples of the edible oil or fat are the same as described as examples for the base oil of the frying fats and oils composition. Examples of an auxiliary which is appropriately added to the coloring inhibitor include an antioxidant, an antifoaming agent, an emulsifier, a flavor, a physiologically active substance, and the like.

A content of the prepared oil in the coloring inhibitor is usually 5% by mass or more and 100% by mass or less, preferably 10% by mass or more and 100% by mass or less, more preferably 20% by mass or more and 100% by mass or less.

The coloration-suppressing effect according to the present invention can be evaluated by the following method, for example.

1. Measurement of Color Tone

A color of a test oil or a control oil contained in a Lovibond cell is measured using an automatic Lovibond colorimeter in accordance with AOCS Cc13j-97 at room temperature. From the obtained color chromaticity values Y and R, a color tone (Y+10R) is determined.

2. Calculation of Coloration Suppression Ratio

A coloration suppression ratio of the test oil based on the color tone of the control oil is calculated in accordance with the following equation.

[Equation 1]

$$\text{Coloration suppression ratio (\%)} = \left\{1 - \frac{\text{Color tone } (Y + 10R) \text{ of test oil after frying test}}{\text{Color tone } (Y + 10R) \text{ of control oil after frying test}}\right\} \times 100$$

According to the present invention, the coloration suppression ratio based on the control oil without containing the prepared oil according to the present invention varies depending on an addition amount of the prepared oil, a foodstuff, a frying temperature, and the like, but is usually on the order of 5% to 40%.

EXAMPLES

Hereinafter, the present invention will be explained in more detail with reference to Examples of the present invention. However, the present invention is not limited to the following Examples. Note that, for a phosphorus content (ppm by mass) in each table, a value lower than a detection limit was represented by "0". In addition, a phosphorus content (ppm by mass) in the fats and oils composition in each table refers to a value calculated from the phosphorus content in the prepared oil and the addition amount of the prepared oil.

[Preparation Example] Preparation of Refined Oil and Prepared Oil

Each refined oil shown in Table 1 was prepared, and then each prepared oil was prepared in accordance with a characteristic of each refining process shown in Table 1.

TABLE 1

| Name | Product Name or Characteristic of Refining Process of Prepared Oil | Absorbance Difference | Phosphorus Content (mass ppm) |
|---|---|---|---|
| Refined Rapeseed Oil | Product Name "J Canola oil" (containing 3 mass ppm of silicone oil having kinematic viscosity of 1000 cSt, rapeseed oil, manufactured by J-OIL MILLS, Inc.) | 0.003 | 0 |
| Prepared Oil 1 | In the usual refining process of rapeseed oil, the bleaching step is made milder (using activated clay (Product Name: SA90 (manufactured by Nippon Activated Clay Co., Ltd.)), 0.65 mass %, 80° C., 30 minutes). | 0.078 | 2.8 |
| Prepared Oil 2 | In the usual refining process of rapeseed oil, the bleaching step is made milder (using activated clay (Product Name: SA90 (manufactured by Nippon Activated Clay Co., Ltd.)), 0.45 mass %, 80° C., 30 minutes). | 0.100 | 0 |
| Prepared Oil 3 | In the usual refining process of rapeseed oil, the bleaching step is made milder (using activated clay (Product Name: SA90 (manufactured by Nippon Activated Clay Co., Ltd.)), 0.29 mass %, 80° C., 30 minutes). | 0.173 | 0.6 |
| Prepared Oil 4 | In the usual refining process of rapeseed oil, no bleaching step and no deodorizing step are performed. | 0.359 | 2.8 |
| Prepared Oil 5 | In the usual refining process of rapeseed oil, no bleaching step is performed. | 0.389 | 1.8 |
| Prepared Oil 6 | In the usual refining process of rapeseed oil, no bleaching step is performed. | 0.359 | 2.8 |
| Prepared Oil 7 | In the usual refining process of rapeseed oil, no bleaching step is performed. | 0.378 | 1.8 |
| Prepared Oil 8 | In the usual refining process of rapeseed oil, no bleaching step is performed. | 0.379 | 9.3 |
| Prepared Oil 9 | In the usual refining process of rapeseed oil, no bleaching step is performed, and the deodorizing step is changed (200° C., usage amount of water vapor: 2 mass %, 45 minutes, degree of vacuum: 400-700 Pa) | 0.437 | 13.2 |
| Prepared Oil 10 | In the usual refining process of rapeseed oil, no bleaching step is performed, and the deodorizing step is changed (250° C., usage amount of water vapor: 2 mass %, 45 minutes, degree of vacuum: 400-700 Pa). | 0.437 | 12.8 |
| Prepared Oil 11 | In the usual refining process of rapeseed oil, no bleaching step is performed, and the deodorizing step is changed (270° C., usage amount of water vapor: 2 mass %, 45 minutes, degree of vacuum: 400-700 Pa). | 0.437 | 12.4 |
| Prepared Oil 12 | In the usual refining process of rapeseed oil, no bleaching step is performed, and the deodorizing step is changed (250° C., usage amount of water vapor: 8 mass %, 180 minutes, degree of vacuum: 400-700 Pa). | 0.437 | 12.2 |
| Prepared Oil 13 | In the usual refining process of rapeseed oil, no neutralization step is performed, and the bleaching step is made milder (using activated clay (Product Name: SA90 (manufactured by Nippon Activated Clay Co., Ltd.)), 0.25 mass %, 80° C., 30 minutes). | 0.346 | 185.9 |
| Prepared Oil 14 | In the usual refining process of rapeseed oil, no neutralization step and no bleaching step are performed. | 0.443 | 126.7 |
| Prepared Oil 15 | In the usual refining process of rapeseed oil, no neutralization step and no bleaching step are performed. | 0.587 | 130.1 |
| Prepared Oil 16 | Soybean oil subjected to the usual refining process | 0.003 | 0 |
| Refined Soybean Oil | Product Name "J Soybean Shirashime (refined) Oil" (containing 3 mass ppm of silicone oil having kinematic viscosity of 1000 cSt, soybean oil, manufactured by J-OIL MILLS, Inc.) | 0.003 | 0 |
| Prepared Oil 17 | In the usual refining process of soybean oil, no bleaching step is performed. | 0.035 | 1.6 |
| Refined Palm Olein (Containing Silicone) | Product Name "Frying Oil J" (containing 3 mass ppm of silicone oil having kinematic viscosity of 1000 cSt, palm olein, iodine value: 67, manufactured by J-OIL MILLS, Inc.) | 0.003 | 0 |
| Refined Palm Olein | Refined palm olein of above "Frying Oil J" before adding silicone oil | 0.003 | 0 |

Absorbance differences of each refined oil and prepared oil were calculated, and phosphorus contents in the refined oil and prepared oil were measured in accordance with the following method.
(Absorbance Difference)

Isooctane (spectrometry reagent, manufactured by Wako Pure Chemical Industries, Ltd.) was put into quartz cells (1 cm) for control and measurement, and baseline correction was performed in a range of 600 to 750 nm using an ultraviolet visible spectrophotometer (product name: "SHIMADZU UV-2450" manufactured by Shimadzu Corporation). Subsequently, the test oil or fat was put into the quartz cell for measurement, and measured an absorbance. An absorbance (absorbance difference) at 660 nm relative to an absorbance of zero at 750 nm was described.
(Phosphorus Content)

The test oil or fat was diluted with xylene, and analyzed using ICP emission spectrophotometer (manufactured by Hitachi High-Tech Science Corporation). Additionally, for quantification, CONOSTAN (registered trademark) Oil Analysis Standard (manufactured by SCP SCIENCE) was used.

[Examples 1 to 4] Test of Changing Bleaching Step of Prepared Oil (1) Preparation of Frying Fats and Oils Composition Each prepared oil shown in Table 2 was added to the refined rapeseed oil as a base oil in an amount of 2 or 3% by mass to prepare each frying fats and oils composition. Hereinafter, the base oil is referred to as a control oil, and the fats and oils composition obtained by adding the prepared oil to the base oil is referred to as test oil.
(2) Frying Test The frying test of the test oil and the control oil was performed in the following procedure. Note that the frying test of the control oil was also performed for each test. The same applies to the other examples.

First, as a fried food for the frying test, the following processed foods were prepared.

Deep-fried chicken: product name "Wakadori Karaage (GX388)" (manufactured by AJINOMOTO FROZEN FOOD Co., Inc.)

Potato croquette: product name "NEW Potato Croquette 60 (GC080)" (about 60 g/piece, manufactured by AJINOMOTO FROZEN FOOD Co., Inc.)

Into an electric fryer (product name: FM-3HR, manufactured by MACH Electric Cooker), 3.4 kg of test oil or control oil was put, and heated to a frying temperature of 180° C. After heating, the deep-fried chicken or the potato croquette was put into the electric fryer with the following requirements, frying was performed for 10 hours a day, i.e. for a cumulative total time of 20 hours.
(Frying Condition)

[Deep-fried chicken] mass of chicken: 400 g/frying, frying time: 5 minutes/frying, number of frying: 5 times/day (performed on the first day and second day)

[Potato croquette] number of croquettes: 5 pieces/frying, frying time: 5 minutes/frying, number of frying: 2 times/day (performed only on the first day)
(3) Evaluation of Coloration-Suppressing Effect of Fats and Oils Composition The test oil and the control oil after the frying test were sampled, and evaluated for the coloration-suppressing effect in accordance with the following method.
1. Measurement of Color Tone A color of a test oil or a control oil contained in a Lovibond cell (W600/OG/1 inch) was measured using an automatic Lovibond colorimeter (Lovibond (registered trademark) PFXi-880, manufactured by Tintometer Ltd.) in accordance with AOCS Cc13j-97 at room temperature. From the obtained color values Y and R, a color tone (Y+10R) was determined.
2. Calculation of Coloration Suppression Ratio A coloration suppression ratio of the test oil based on the color tone of the control oil was calculated in accordance with the following equation.

[Equation 2]

$$\text{Coloration suppression ratio}(\%) = \left\{1 - \frac{\text{Color tone } (Y + 10R) \text{ of test oil after frying test}}{\text{Color tone } (Y + 10R) \text{ of control oil after frying test}}\right\} \times 100$$

The results are shown in Table 2.

TABLE 2

| | | Raw material composition of Fats and oils composition | | | | | | | | | |
|---|---|---|---|---|---|---|---|---|---|---|---|
| | | Prepared Oil | | | | | | | Phosphorus | | |
| | | | Refining Process | | | | | | Content In | | Coloration |
| | Base Oil | | Degumming | Neutralizing | Bleaching | Deodorizing | Absorbance Difference | Phosphorus Content (mass ppm) | Addition Amount (mass %) | Fats and oils composition (mass ppm) | Color Tone | Suppression Ratio (%) |
| Comparative Example 1 | Refined Rapeseed Oil | | | | | | — | | | — | 28 | — |
| Example 1 | | Prepared Oil 1 | ○ | ○ | Δ | ○ | 0.078 | 2.8 | 3.0 | 0.084 | 25 | 10.7 |
| Comparative Example 2 | Refined Rapeseed Oil | | | | | | — | | | — | 34 | — |
| Example 2 | | Prepared Oil 2 | ○ | ○ | Δ | ○ | 0.100 | 0 | 2.0 | 0 | 29 | 14.7 |
| Example 3 | | Prepared Oil 3 | ○ | ○ | Δ | ○ | 0.173 | 0.6 | 2.0 | 0.012 | 28 | 17.6 |
| Example 4 | | Prepared Oil 5 | ○ | ○ | x | ○ | 0.389 | 1.8 | 2.0 | 0.036 | 27 | 20.6 |

○: Usual Refining Condition, Δ: Mild Refining Condition, x: Not Performed

In Comparative Example 1 using the control oil (refined rapeseed oil subjected to the degumming step, the neutralization step, bleaching step, and deodorizing step under a usual condition), a color tone after the frying test for 20 hours was 28. On the other hand, in Example 1 using the test oil blended with a prepared oil 1 according to the present invention, a color tone was suppressed to 25. That means, the present invention suppressed the coloration by 10.7%. Also in Examples 2 to 4 using a test oil blended with a prepared oil 2, 3, or 5 according to the present invention, a coloration suppression ratio of 14.7 to 20.6% was achieved. Since a phosphorus content in each fats and oils composition of these Examples was as low as 0 to 0.084 ppm by mass, the coloration-suppressing effect in Examples did not result from the phosphorus content described in Patent Document 1. As described above, it was found that the prepared oil prepared so as to have an absorbance difference after the bleaching step or without the bleaching step according to the present invention had an effect of suppressing coloration of the fats and oils composition during frying.

[Example 5] Test of Changing Deodorizing Step of Prepared Oil (1)

For the purpose of testing whether or not the prepared oil used in the present invention needed to be subjected to the deodorizing step in the refining process, a prepared oil 4 (Comparative Example 4) not subjected to the bleaching and deodorizing steps, or a prepared oil 6 (Example 5) not subjected to the bleaching step but to the deodorizing step was added to a base oil in an amount of 1.6% by mass to prepare each test oil. A frying test and evaluation of these test oils were performed in the same procedure as in Example 1. The results are shown in Table 3.

TABLE 3

| | Raw material composition of Fats and oils composition | | | | | | | | | Phosphorus | | |
|---|---|---|---|---|---|---|---|---|---|---|---|---|
| | | Prepared Oil | | | | | | | | Content In | | |
| | | | Refining Process | | | | | | | | | Coloration |
| | Base Oil | | De-gumming | Neutral-izing | Bleach-ing | Deo-dori-zing | Absorbance Difference | Phosphorus Content (mass ppm) | Addition Amount (mass %) | Fats and oils composition (mass ppm) | Color Tone | Suppression Ratio (%) |
| Comparative Example 3 | Refined Rapeseed Oil | | | | | — | | | | — | 35 | — |
| Comparative Example 4 | | Prepared Oil 4 | ○ | ○ | x | x | 0.359 | 2.8 | 1.6 | 0.045 | 41 | −17.1 |
| Example 5 | | Prepared Oil 6 | ○ | ○ | x | ○ | 0.359 | 2.8 | 1.6 | 0.045 | 24 | 31.4 |

○: Usual Refining Condition, x: Not Performed

As shown in Comparative Example 4, although the prepared oil was prepared so as to have an absorbance difference prescribed in the present invention, the test oil containing the prepared oil 4 not subjected to the deodorizing step showed enhanced coloration after the frying test compared to the control oil. On the other hand, as described in Comparative Example 5, the test oil prepared so as to have an absorbance difference prescribed in the present invention, and containing the prepared oil 6 subjected to the deodorizing step showed remarkable suppression of coloration after the frying test. From these results, it was found that the prepared oil used in the present invention needed to be subjected to the deodorizing step.

[Examples 6 to 9] Test of Changing Deodorizing Step of Prepared Oil (2)

For the purpose of studying the refining conditions in the deodorizing step of the prepared oil used in the present invention, each of a prepared oil 9 subjected to a mild deodorizing step, a prepared oil 10 subjected to a usual deodorizing step, or prepared oils 11 and 12 subjected to an enhanced deodorizing step was added to a base oil in an amount of 2.0% by mass to prepare each test oil. A frying test and evaluation of these test oils were performed in the same procedure as in Example 1. The results are shown in Table 4.

TABLE 4

Raw material composition of Fats and oils composition

| | | Prepared Oil | | | | | | | Phosphorus Content In | | Coloration |
|---|---|---|---|---|---|---|---|---|---|---|---|
| | | Refining Process | | | | | | | | | |
| | Base Oil | | De-gumming | Neutral-izing | Bleach-ing | Deo-dori-zing | Absorbance Difference | Phosphorus Content (mass ppm) | Addition Amount (mass %) | Fats and oils composition (mass ppm) | Color Tone | Suppression Ratio (%) |
| Comparative Example 5 | Refined Rapeseed Oil | | | | | — | | | | — | 49 | — |
| Example 6 | Oil | Prepared Oil 9 | ○ | ○ | X | Δ | 0.437 | 13.2 | 2.0 | 0.26 | 45 | 8.2 |
| Example 7 | | Prepared Oil 10 | | | | ○ | | 12.8 | 2.0 | 0.26 | 44 | 10.2 |
| Example 8 | | Prepared Oil 11 | | | | ◉ | | 12.4 | 2.0 | 0.25 | 31 | 36.7 |
| Example 9 | | Prepared Oil 12 | | | | ◉ | | 12.2 | 2.0 | 0.24 | 34 | 30.6 |

○: Usual Refining Condition, X: Not Performed, Δ: Mild Refining Condition, ◉: Enhanced Refining Condition As shown in Table 4, in all deodorizing conditions, coloration of the test oil after the frying test was suppressed. In addition, as the deodorizing step condition in the refining process was enhanced, the coloration suppression ratio of the test oil was improved.

[Examples 10 to 12] Test of Changing Neutralization Step of Prepared Oil

For the purpose of testing whether or not the prepared oil used in the present invention needed to be subjected to the neutralization step in the refining process, prepared oils 13 to 15 having absorbance differences prescribed in the present invention but not subjected to the bleaching and deodorizing steps were added to a base oil in an amount of 2% by mass to prepare each test oil. A frying test and evaluation of these test oils were performed in the same procedure as in Example 1. The results are shown in Table 5.

As shown in Table 5, as long as the prepared oil had a certain absorbance difference according to the present invention, the effect of the present invention was obtained regardless of the presence or absence of the neutralization step. When comparing Example 7 with Example 11, it can be seen that the coloration-suppressing effect is improved by omitting the neutralization step. It is considered that the high coloration suppression ratios in Examples 10 to 12 also reflected the effect of the phosphorus content in the prepared oil.

[Examples 13 to 16] Test of Changing Addition Amount of Prepared Oil

A test of changing an addition amount of the prepared oil in the frying fats and oils composition according to the present invention was performed. Specifically, in an addition amount shown in Table 6, a prepared oil 7 not subjected to

TABLE 5

Raw material composition of Fats and oils composition

| | | Prepared Oil | | | | | | | Phosphorus Content In | | Coloration |
|---|---|---|---|---|---|---|---|---|---|---|---|
| | | Refining Process | | | | | | | | | |
| | Base Oil | | De-gumming | Neutral-izing | Bleach-ing | Deo-dori-zing | Absorbance Difference | Phosphorus Content (mass ppm) | Addition Amount (mass %) | Fats and oils composition (mass ppm) | Color Tone | Suppression Ratio (%) |
| Comparative Example 5 | Refined Rapeseed Oil | | | | | — | | | | — | 49 | — |
| Example 7 | Oil | Prepared Oil 10 | ○ | ○ | x | ○ | 0.437 | 12.8 | 2.0 | 0.26 | 44 | 10.2 |
| Comparative Example 6 | Refined Rapeseed Oil | | | | | — | | | | — | 34 | — |
| Example 10 | Oil | Prepared Oil 13 | ○ | x | Δ | ○ | 0.346 | 185.9 | 2.0 | 3.7 | 26 | 23.5 |
| Comparative Example 7 | Refined Rapeseed Oil | | | | | — | | | | — | 25.6 | — |
| Example 11 | Oil | Prepared Oil 14 | ○ | x | x | ○ | 0.443 | 126.7 | 2.0 | 2.5 | 19.5 | 23.8 |
| Comparative Example 8 | Refined Rapeseed Oil | | | | | — | | | | — | 28 | — |
| Example 12 | Oil | Prepared Oil 15 | ○ | x | x | ○ | 0.587 | 130.1 | 2.0 | 2.6 | 19.2 | 31.4 | o: Usual Refining Condition, Δ: Mild Refining Condition, x: Not Performed the bleaching step in the refining process of the crude oil was added to a base oil to prepare each test oil. A frying test and evaluation of these test oils were performed in the same procedure as in Example 1. The results are shown in Table 6.

TABLE 6

| | Raw material composition of Fats and oils composition | | | | | | | | | | |
|---|---|---|---|---|---|---|---|---|---|---|---|
| | | Prepared Oil | | | | | | | Phosphorus | | Coloration |
| | | | Refining Process | | | | | | Content In | | |
| | Base Oil | | De-gum-ming | Neutral-izing | Bleach-ing | Deo-dori-zing | Absorbance Difference | Phosphorus Content (mass ppm) | Addition Amount (mass %) | Fats and oils composition (mass ppm) | Color Tone | Suppression Ratio (%) |
| Comparative Example 9 | Refined Rapeseed Oil | | | | | — | | | | — | 32.0 | — |
| Example 13 | | Prepared Oil 7 | ○ | ○ | x | ○ | 0.378 | 1.8 | 0.3 | 0.005 | 27.0 | 15.6 |
| Example 14 | | | | | | | | | 0.5 | 0.009 | 23.0 | 28.1 |
| Example 15 | | | | | | | | | 1.5 | 0.027 | 20.1 | 37.2 |
| Example 16 | | | | | | | | | 6.0 | 0.11 | 25.7 | 19.7 |

○: Usual Refining Condition, x: Not Performed

When frying was performed using the test oil blended with the prepared oil according to the present invention as shown in Table 6, coloration of the fats and oils composition after the frying test was significantly suppressed compared to the control oil. From the results in Examples 13 to 16, when a content of the prepared oil in the frying fats and oils composition was 0.3% by mass or more and 6% by mass or less, an effect could be obtained, particularly when the content was 0.5% by mass or more and 6% by mass or less, a higher effect could be obtained, and when the content was 0.5% by mass or more and 1.5% by mass or less, a particularly higher effect could be obtained.

[Examples 17 to 20] Test of Changing Base Oil

In Examples 13 to 16, a test of changing the base oil was performed. Specifically, the prepared oil 7 or 8 was added to each base oil shown in Table 7 in an amount of 2.0% by mass to prepare each test oil. A frying test and evaluation of these test oils were performed in the same procedure as in Example 1. The results are shown in Table 7.

TABLE 7

| | Raw material composition of Fats and oils composition | | | | | | | | | | |
|---|---|---|---|---|---|---|---|---|---|---|---|
| | | Prepared Oil | | | | | | | Phosphorus | | Coloration |
| | | | Refining Process | | | | | | Content In | | |
| | Base Oil | | De-gum-ming | Neutral-izing | Bleach-ing | Deo-dori-zing | Absorbance Difference | Phosphorus Content (mass ppm) | Addition Amount (mass %) | Fats and oils composition (mass ppm) | Color Tone | Suppression Ratio (%) |
| Comparative Example 10 | Refined Soybean Oil | | | | | — | | | | — | 22.3 | — |
| Example 17 | | Prepared Oil 7 | ○ | ○ | x | ○ | 0.378 | 1.8 | 2.0 | 0.036 | 20.8 | 6.7 |
| Comparative Example 11 | Refined Palm Olein (Containing Silicone oil) | | | | | — | | | | — | 50 | — |
| Example 18 | | Prepared Oil 7 | ○ | ○ | x | ○ | 0.378 | 1.8 | 2.0 | 0.036 | 38 | 24.0 |
| Comparative Example 12 | Refined Palm Olein | | | | | — | | | | — | 38 | — |
| Example 19 | | Prepared Oil 8 | ○ | ○ | x | ○ | 0.379 | 9.3 | 2.0 | 0.19 | 35 | 7.9 |
| Comparative Example 13 | Formulated Oil* | | | | | — | | | | — | 35 | — |
| Example 20 | | Prepared Oil 7 | ○ | ○ | x | ○ | 0.378 | 1.8 | 2.0 | 0.036 | 33 | 5.7 |

*Refined Rapeseed Oil: Refined Soybean Oil: Refined Palm Olein (Containing Silicone oil) = 4:3:3

As shown in Table 7, even when the base oil was changed from the rapeseed oil to soybean oil, palm olein, or a formulated oil thereof, coloration of the fats and oils composition after the frying test could be suppressed. When comparing Example 18 with Example 19, it can be seen that a remarkable coloration-suppressing effect can be obtained in the frying fats and oils composition containing a silicone oil.

[Example 21] Test of Changing Oil Feedstock of Prepared Oil (1)

A test in which an oil feedstock of the prepared oil was changed from rapeseed to soybean was performed. A prepared oil 17 derived from soybean and not subjected to the bleaching step was added to a base oil in an amount of 10% by mass to prepare a test oil. In addition, a soybean oil (prepared oil 16) subjected to a usual refining process was added to a refined rapeseed oil in an amount of 10% by mass to prepare a control oil of Comparative Example 14. A frying test and evaluation of the test oil and the control oil were performed in the same procedure as in Example 1. The results are shown in Table 8.

TABLE 8

| | | Raw material composition of Fats and oils composition | | | | | | | | |
|---|---|---|---|---|---|---|---|---|---|---|
| | | Prepared Oil | | | | | | Phosphorus | | |
| | | Refining Process | | | | | | Content In | | Coloration |
| | Base Oil | De-gum-ming | Neutral-izing | Bleach-ing | Deo-dori-zing | Absorbance Difference | Phosphorus Content (mass ppm) | Addition Amount (mass %) | Fats and oils composition (mass ppm) | Color Tone | Suppression Ratio (%) |
| Comparative Example 14 | Refined Rapeseed Oil | Prepared Oil 16 ○ | ○ | ○ | ○ | 0.003 | 0 | 10 | 0 | 29 | — |
| Example 21 | | Prepared Oil 17 ○ | ○ | x | ○ | 0.035 | 1.6 | 10 | 0.16 | 21.6 | 25.5 |

As shown in Table 8, even when the oil feedstock of the prepared oil was changed from the rapeseed to the soybean, coloration of the fats and oils composition after the frying test could be suppressed.

[Examples 22 to 23] Test of Combining Prepared Oil with Chlorophyll Pigment

The test in which a chlorophyll pigment was further added to the prepared oil according to the present invention was performed. A prepared oil 13 having an absorbance difference prescribed in the present invention but not subjected to the neutralization step was added to a base oil in an amount of 2% by mass to prepare a test oil (Example 22). A prepared oil 13 having an absorbance difference prescribed in the present invention but not subjected to the neutralization step was added to a base oil in an amount of 2% by mass, and further a chlorophyll pigment (product name "NICHINO COLOR G-A0", manufactured by Nichino Kagaku Kogyo Co., Ltd.) was added to the base oil in an amount of 8.4 ppm by mass to prepare a test oil (Example 23). As a control, a control oil composed of a refined rapeseed oil was prepared (Comparative Example 15). The test oils of Examples and the control oil of Comparative Example were subjected to a frying test and evaluation in the same operation as in Example 1. The results are shown in Table 9.

TABLE 9

| | | Raw material composition of Fats and oils composition | | | | | | | | |
|---|---|---|---|---|---|---|---|---|---|---|
| | | Prepared Oil | | | | | | Phosphorus | | |
| | | Refining Process | | | | Absor- | Phosphorus | | Content In | | Coloration |
| | Base Oil | De-gum-ming | Neutral-izing | Bleach-ing | Deo-dori-zing | bance Difference | Content (mass ppm) | Addition Amount (mass %) | Fats and oils composition (mass ppm) | Color Tone | Suppression Ratio (%) |
| Comparative Example 15 | Refined Rape-seed Oil | | | | | — | | | — | 29 | — |
| Example 22 | | Prepared Oil 13 ○ | x | Δ | ○ | 0.346 | 185.9 | 2.0 | 3.7 | 22.4 | 22.8 |

TABLE 9-continued

| | | Raw material composition of Fats and oils composition | | | | | | | | | |
|---|---|---|---|---|---|---|---|---|---|---|---|
| | | Prepared Oil | | | | | | | Phosphorus | | |
| | | | Refining Process | | | Absor- | Phosphorus | | Content In | | Coloration |
| | Base Oil | De- gum- ming | Neutral- izing | Bleach- ing | Deo- dori- zing | bance Dif- ference | Content (mass ppm) | Addition Amount (mass %) | Fats and oils composition (mass ppm) | Color Tone | Suppression Ratio (%) |
| Example 23 | Prepared Oil 13 + Chloro- phyll Pigment | ○ | x | Δ | ○ | 0.346 | 185.9 | 2.0 | 3.7 | 17 | 41.4 |

From the comparison of Example 22 with Example 23 in Table 9, coloration of the fats and oils composition after the frying test was more remarkably suppressed by adding the prepared oil according to the present invention and the chlorophyll pigment in combination.

[Example 24] Test of Changing Oil Feedstock of Prepared Oil (2)

An experiment was performed using an extra virgin olive oil as an oil type of the prepared oil according to the present invention. As the extra virgin olive oil, "AJINOMOTO OLIVE OIL EXTRA VIRGIN" (manufactured by J-OIL MILLS, Inc.) was used. This prepared oil was subjected to the degumming step, the neutralization step, and deodorizing step, but not subjected to the bleaching step, and had 0.178 of absorbance difference prescribed in the present invention. This prepared oil was added to a base oil (refined rapeseed oil) in an amount of 3% by mass to prepare a test oil. As a control, a control oil composed of the refined rapeseed oil was prepared (Comparative Example 16). The test oil of Example 24 and the control oil of Comparative Example 16 were subjected to a frying test under the following frying conditions for 10 hours a day, i.e. for a cumulative total time of 30 hours.
(Frying Conditions)
[Deep-fried chicken] mass of chicken: 400 g/frying, frying time: 5 minutes/frying, number of frying: 5 times/day (the first to third days)
[Potato croquette] number of croquettes: 5 pieces/frying, frying time: 5 minutes/frying, number of frying: 2 times/day (performed only on the first day)
Other conditions for the frying test and evaluation were the same as in Example 1. The results are shown in Table 10.

As shown in Table 10, a color tone of the oil composition after the frying test was 78 in Comparative Example 16, and 65 in Example 24. That means, coloration of the fats and oils composition after the frying test in Example 24 was suppressed by 7.1% compared to Comparative Example 16. From this result, it was found that, even in the test oil containing the prepared oil of the oil type composed of olive oil, an effect of suppressing coloration of the fats and oils composition after the frying test was obtained.

[Example 25] Test of Changing Oil Feedstock of Prepared Oil (3)

An experiment was performed using a grape seed oil as an oil type of the prepared oil. As the grape seed oil, "COOP Grape Seed Oil" (manufactured by J-OIL MILLS, Inc.) was used. This grape seed oil was subjected to the degumming step, the neutralization step, the bleaching step, and the deodorizing step, had 0.322 of the absorbance difference after the deodorizing step, and had 0.1 ppm by mass of phosphorus content. The absorbability difference of the grape seed oil after the deodorizing step was smaller than before the deodorizing step by the deodorization. Thus, the absorbability difference prescribed in the present invention was at least 0.322. The prepared oil in a compounding ratio of 1.5% by mass was added to a base oil (refined rapeseed oil) to prepare a test oil (Example 25). A phosphorus content in this test oil was 0.001 ppm by mass. As a control, a control oil (Comparative Example 17) composed of the refined rapeseed oil was prepared. The control oil of Comparative Example 17 and the test oil of Example 25 were subjected to a frying test under the following frying conditions for 8 hours a day, i.e. for a cumulative total time of 32 hours.

TABLE 10

| | | Raw material composition of Fats and oils composition | | | | | | | | | |
|---|---|---|---|---|---|---|---|---|---|---|---|
| | | Prepared Oil | | | | | | | Phosphorus | | |
| | | | Refining Process | | | | | | Content In | | Coloration |
| | Base Oil | De- gum- ming | Neutral- izing | Bleach- ing | Deo- dori- zing | Absorbance Difference | Phosphorus Content (mass ppm) | Addition Amount (mass %) | Fats and oils composition (mass ppm) | Color Tone | Suppression Ratio (%) |
| Comparative Example 16 | Refined Rapeseed Oil | | | | | — | | 0 | — | 78 | — |
| Example 24 | | EVOO* | ○ | ○ | x | ○ | 0.178 | 0 | 3 | 0 | 65 | 7.1 |

*EVOO: Extra Virgin Olive Oil (Frying Conditions)

[Deep-fried chicken] mass of chicken: 400 g/frying, frying time: 5 minutes/frying, number of frying: 4 times/day (the first to fourth days)

[Potato croquette] number of croquettes: 5 pieces/frying, frying time: 5 minutes/frying, number of frying: 2 times/day (performed only on the first day)

Other conditions for the frying test and evaluation were the same as in Example 1.

In Comparative Example 17, a color tone of the fats and oils composition after the frying test was 103, but in Example 25, a color tone of the fats and oils composition after the frying test was 87. That means, the test oil of Example 25 showed an effect of suppressing coloration by 15.5% compared to the control oil of Comparative Example 17. From this result, it was found that the grape seed oil had an effect of suppressing coloration of the frying fats and oils composition containing the grape seed oil after the frying test.

The invention claimed is:

1. A method for suppressing coloration of a frying fats and oils composition, the method including a step of adding a prepared oil to an edible oil or fat, wherein
the prepared oil is obtained through
   (1) a degumming step,
   (2) a neutralization step which is performed or not performed,
   (3) a bleaching step which is performed or not performed, and
   (4) a deodorizing step,
in this order, in a process of refining a crude oil obtained from an oil feedstock, and
   an absorbance difference determined by subtracting an absorbance at a wavelength of 750 nm from an absorbance at a wavelength of 660 nm of the prepared oil after the step (3) is at least 0.030 when isooctane is used as a control.

2. The method for suppressing as claimed in claim 1, wherein the absorbance difference is at least 0.045.

3. The method for suppressing as claimed in claim 1, wherein the deodorizing step is performed under a condition that a usage amount of water vapor is 0.1% by mass or more and 10% by mass or less, a deodorizing temperature is 180° C. or more and 300° C. or less, and a deodorizing time is 10 minutes or more and 240 minutes or less.

4. The method for suppressing as claimed in claim 1, wherein the oil feedstock is at least one selected from soybean, rapeseed, and palm flesh.

5. The method for suppressing as claimed in claim 1, wherein the edible oil or fat contains at least one selected from soybean oil, rapeseed oil, palm-based oil or fat, corn oil, sunflower oil, olive oil, cottonseed oil, rice bran oil, and safflower oil.

6. The method for suppressing as claimed in claim 1, wherein a content of the prepared oil in the frying fats and oils composition is 0.05% by mass or more and 20% by mass or less.

7. The method for suppressing as claimed in claim 1, wherein the prepared oil is added to the edible oil or fat such that a phosphorus content derived from the prepared oil in the frying fats and oils composition is 0.01 ppm by mass or more and 10 ppm by mass or less.

8. The method for suppressing as claimed in claim 1, wherein the bleaching step (3) is performed.

9. The method for suppressing as claimed in claim 1, wherein the frying fats and oils composition contains a silicone.

10. A coloring inhibitor for a frying fats and oils composition, the coloring inhibitor containing a prepared oil, wherein
the prepared oil is obtained through
   (1) a degumming step,
   (2) a neutralization step which is performed or not performed,
   (3) a bleaching step which is performed or not performed, and
   (4) a deodorizing step,
in this order, in a process of refining a crude oil obtained from an oil feedstock, and
   an absorbance difference determined by subtracting an absorbance at a wavelength of 750 nm from an absorbance at a wavelength of 660 nm of the prepared oil after the step (3) is at least 0.030 when isooctane is used as a control.

* * * * *